United States Patent
Gibbs et al.

(10) Patent No.: US 12,139,575 B2
(45) Date of Patent: Nov. 12, 2024

(54) FAST-CURE RESIN FORMULATIONS WITH CONSISTENT HANDLING CHARACTERISTICS

(71) Applicant: CYTEC INDUSTRIES, INC., Princeton, NJ (US)

(72) Inventors: Andrew Gibbs, Chesterfield (GB); Lewis Williams, Alpharetta (GA); Stephen Corden, Staffordshire (GB)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 16/977,311

(22) PCT Filed: Mar. 1, 2019

(86) PCT No.: PCT/US2019/020440
§ 371 (c)(1),
(2) Date: Sep. 1, 2020

(87) PCT Pub. No.: WO2019/169360
PCT Pub. Date: Sep. 6, 2019

(65) Prior Publication Data
US 2021/0047460 A1 Feb. 18, 2021

Related U.S. Application Data

(60) Provisional application No. 62/637,362, filed on Mar. 1, 2018.

(51) Int. Cl.
| | | |
|---|---|---|
| C08J 5/24 | (2006.01) | |
| B32B 27/38 | (2006.01) | |
| C08G 59/24 | (2006.01) | |
| C08G 59/38 | (2006.01) | |
| C08G 59/40 | (2006.01) | |
| C08G 59/50 | (2006.01) | |
| C08J 5/04 | (2006.01) | |
| C08K 5/14 | (2006.01) | |
| C08L 33/08 | (2006.01) | |
| C08L 63/00 | (2006.01) | |
| C08L 63/02 | (2006.01) | |
| C08L 63/04 | (2006.01) | |
| C08L 65/02 | (2006.01) | |
| C08L 75/02 | (2006.01) | |
| C08L 81/06 | (2006.01) | |

(52) U.S. Cl.
CPC ....... *C08G 59/245* (2013.01); *C08G 59/4021* (2013.01); *C08G 59/5073* (2013.01); *C08G 59/5086* (2013.01); *C08J 5/042* (2013.01); *C08J 5/243* (2021.05); *C08J 5/249* (2021.05); *C08K 5/14* (2013.01); *C08L 33/08* (2013.01); *C08L 65/02* (2013.01); *C08L 75/02* (2013.01); *C08L 81/06* (2013.01); *C08J 2363/04* (2013.01); *C08L 2203/30* (2013.01)

(58) Field of Classification Search
None
See application file for complete search history.

(56) References Cited

U.S. PATENT DOCUMENTS

| | | |
|---|---|---|
| 2014/0163139 A1 | 6/2014 | Wang et al. |
| 2016/0002390 A1 * | 1/2016 | Hughes .............. C08K 3/04 523/400 |

FOREIGN PATENT DOCUMENTS

| | | | | |
|---|---|---|---|---|
| EP | 1279688 A1 | 1/2003 | | |
| EP | 3067200 A1 | 9/2016 | | |
| EP | 3190147 A1 | 7/2017 | | |
| JP | 01201321 A * | 8/1989 | ............. | C08L 63/00 |
| WO | 2009018194 A1 | 2/2009 | | |
| WO | 2009118536 A2 | 10/2009 | | |
| WO | 2014096435 A2 | 6/2014 | | |
| WO | 2014125044 A1 | 8/2014 | | |
| WO | 2017030988 A1 | 2/2017 | | |

OTHER PUBLICATIONS

Machine translation of JP-01201321-A (no date).*

* cited by examiner

*Primary Examiner* — Michael J Feely
(74) *Attorney, Agent, or Firm* — Osha Bergman Watanabe & Burton LLP (57) ABSTRACT

The present invention relates to rapid-curing resin formulations as well as fiber-reinforced composite materials comprising the same and their use in the manufacture of molded articles, particularly where the manufacturing process requires high throughput and where resin formulations having consistent handling characteristics (e.g., tack and flexibility) would be preferable across normal to elevated laminating environments (as defined by temperatures between 20° C. and 60° C.). The present invention further relates to a manufacturing process for preparing an article, particularly a molded article, from a fiber-reinforced composite material comprising a rapid-curing resin formulation.

20 Claims, 1 Drawing Sheet

FAST-CURE RESIN FORMULATIONS WITH CONSISTENT HANDLING CHARACTERISTICS

RELATED APPLICATIONS

This application is a U.S. national stage entry under 35 U.S.C. § 371 of International Application No. PCT/US2019/020440 filed Mar. 1, 2019, which claims priority to U.S. provisional application No. 62/637,362, filed Mar. 1, 2018. The entire contents of these applications are explicitly incorporated herein by this reference.

BACKGROUND

A fibrous layer of material (e.g., carbon fiber or glass fiber, among numerous others), or a fabric made from such materials, which has been partially or fully impregnated with a resin, such as a curable resin is known as a pre-preg. Fiber-reinforced resins, including pre-pregs, are used to form cured composite articles. Multilayers of fiber reinforcement (e.g., in a pre-preg) and resins may be laid up in a mold, and then cured to form a cured composite article. Such cured composite articles can be used, for example in automobile, aircraft or spacecraft structural components. In certain fields, such as automobile structural components, in addition to the structural and technical requirements of the cured composite article there is an added need for high throughput. Materials that are appropriate for aircraft or spacecraft may, therefore, not be adequate for use in automobiles—not because the resulting article is structurally inadequate, but because the means for making such resulting article are too costly or time consuming.

There has been considerable effort made to reduce the cure cycle time of materials for use in such high-throughput applications. Cure cycles are a balance of temperature and time, taking into account the reactivity of the resin and the amount of resin and fiber employed. For example, the exothermic curing reaction of epoxy resins makes it easy for the system to overheat, risking significant damage to the material and mold—so the curing of epoxy resins cannot take place at temperatures that are too high and as a result can often take significant time. Although fast-curing resin formulations are known in the art (see, e.g., WO-2014/096435 and EP-1279688), they can exhibit inferior development of glass transition temperature (Tg) in the curing process, particularly when cured using short cure cycles in a press-molding process. An inferior Tg increases the likelihood that the molded part distorts upon removal from the hot mold and also leads to issues in applications where the article is expected to work at elevated temperatures. However, even in formulations having an acceptable Tg, issues with handling resin formulations increase when the chemistry of ingredients allow for rapid cure cycles.

Resin systems have been developed with handling characteristics that provide very low or zero tack, e.g., for completely automated processes. See, e.g., EP 2268720 However, material with handling characteristics, including tack, that are suitable for processes that occur at ambient or slightly elevated temperatures (such as cross-ply and reposition applications) remains elusive.

SUMMARY OF THE INVENTION

Therefore, there remains a need for a resin system capable of rapid curing at a particular temperature that has adequate handling characteristics (including tack and flexibility) across normal to elevated laminating environments (as defined by temperatures between 20° C. and 60° C.). In particular, such a curable resin cannot be too rigid to manipulate at handling temperatures (e.g., from 20° C. to about 60° C.), e.g., during lay up of materials. At the same time, however, the same curable resin should not be so tacky that it adheres excessively to the tool (e.g., instead of adhering properly to the reinforcing fibers), potentially resulting in the transfer of residue when repositioning material or, in the case of uni-directional pre-preg, shredding apart of the material when it is repositioned on the tool. As used herein, "shredding apart" refers to the phenomenon where part of a material remains in contact with the tool surface whilst the rest of the material leaves the tool surface, and can occur when pre-preg is removed from a tool for repositioning. Such a resin system would also preferably enable the cured material to be demolded at temperatures near or at the curing temperature.

Therefore, according to a first aspect of the present invention, there is provided a curable resin comprising at least one thermosetting resin, at least one curative and at least one thermoplastic additive in a ratio such that the curable resin exhibits:

(i) a glass transition temperature (Tg) from about 130° C. to about 200° C. when cured;

(ii) a cure conversion of at least 95% when cured for a duration of no more than 10 minutes at a temperature of no more than 10° C. above the Tg of the curable resin when cured;

(iii) a phase angle of between 50° and 87°, and preferably between 70° and 85°, when heated from 20° C. to 60° C.; and (iv) optionally, a complex modulus of between about 100 Pa·s and about 10,000,000 Pa·s between 20 and 60° C.

According to a second aspect of the present invention, there is provided a pre-preg of fiber-reinforced curable composite material, wherein said pre-preg comprises at least one layer of reinforcing fibers impregnated with a curable resin as defined in detail herein.

According to a third aspect of the present invention, there is provided a process for the production of a molded article from a plurality of pre-pregs, the process comprising:

(a) disposing a pre-preg as defined in detail herein into or onto a mold;

(b) optionally repeating step (a) at least once to dispose one or more further pre-pregs into or onto said mold; and (c) curing the plurality of pre-pregs, preferably by thermally curing.

DETAILED DESCRIPTION

Figure 1:
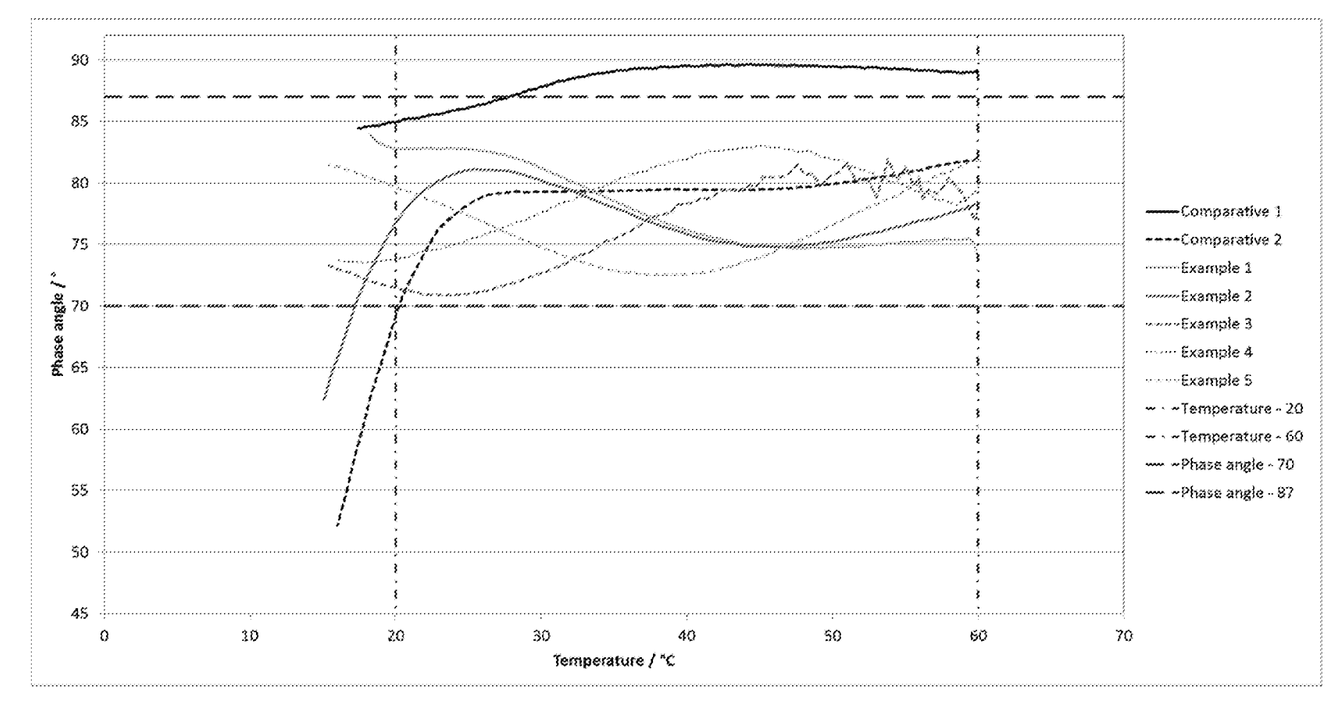
FIG. 1 shows a plot of phase angle versus temperature obtained from heating various embodiments of the invention as compared to materials disclosed in the art.

As discussed above, the progression of a resin through the curing process can result in issues with handling, especially in short cure cycles. The present inventors have discovered curable resins that not only exhibit excellent handling characteristics (i.e., at ambient temperature have a suitable phase angle and complex modulus, such that the resin is not too rigid to manipulate during lay-up), but also consistently maintain these excellent characteristics at higher handling temperatures up to about 60° C. (e.g., consistently maintain a phase angle that is not so high that the resin is too viscous for proper adherence to the reinforcing fibers). Such curable resins also exhibit superior glass transition temperature (Tg) development in the curing process, particularly when cured using short cure cycles in a press-molding process.

The phase angle, the complex modulus G*, the storage modulus G', and the loss modulus G" provide assessments of the handling characteristics of the resin. The phase angle describes the physical state of the resin, where solid or semi-solid has a low phase angle and a more liquid or fluid material has a high phase angle. Thus, as a resin is heated, its ability to flow increases (corresponding to an increase in phase angle) until the action of the curative causes the resin to harden (corresponding to a decrease in phase angle). The complex modulus is the ratio of stress to strain under vibratory conditions, and contains the storage and loss components (i.e., the storage modulus G' and the loss modulus G"). These characteristics allow for an assessment of the elastic response and the viscous behavior of the resin material.

Thermosetting Resin

The curable resin comprises one or more thermosetting resin(s). Although the formulation of the curable resin can be specified to achieve the optimum performance for the intended use of the pre-pregs, thermosetting resins suitable for use in the present invention are preferably selected from epoxy resins, resins comprising vinyl groups, and mixtures thereof.

In one embodiment, the thermosetting resin comprises, or even consists (essentially) of epoxy resins. Epoxy resins can be solid, liquid or semi-solid and are characterized by their functionality and epoxy equivalent weight. The functionality of an epoxy resin is the number of reactive epoxy sites per molecule that are available to react and cure to form the cured structure. The concentration of reactive groups in an epoxy resin is indicated by its epoxy equivalent weight, or EEW. The EEW is the weight (in Daltons) of epoxy resin material per reactive group.

Generally speaking, epoxy resins may be monofunctional, difunctional, or multifunctional—where the term "multifunctional" refers to a resin having a functionality of greater than two. However, in the context of the present invention, the curable resin typically comprises one or more difunctional or multifunctional epoxy resin(s). It is also noted that the term "multifunctional" also encompasses resins which have non-integer functionality. The epoxy resin may further comprise monofunctional epoxy resins or more than one type of difunctional and/or multifunctional epoxy resins. In certain embodiments, the curable resin comprises one or more multifunctional epoxy resin(s) in combination with one or more difunctional epoxy resin(s).

Epoxy resins can, for example, be derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof. Suitable epoxy resins include those based on: diglycidyl ether of bisphenol F, bisphenol A (optionally brominated), phenol and cresol epoxy novolacs or other glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, aliphatic triglycidyl ethers, dialiphatic triglycidyl ethers, triglycidyl aminophenols, epoxy-modified polyoxalidones or polyisocyanates, or any combinations thereof. Certain of the epoxy resins described above can exist in difunctional or multifunctional form, as known to a person of skill in the art.

Epoxy resins suitable for use in the present invention may be commercially available, for example N,N,N',N'-tetraglycidyl diamino diphenylmethane (TGDDM) (e.g. grades MY 9663, MY 720, MY 721 or MY9512; Huntsman); N,N,N', N'-tetraglycidyl-bis(4-aminophenyl)-1,4-diiso-propylbenzene (e.g. EPON 1071; Hexion); N,N,N',N'-tetraglycidyl-bis(4-amino-3,5-dimethylphenyl)-1,4-diisopropylbenzene, (e.g. EPON 1072; Hexion); N,N,N',N'-tetraglycidyl-m-xylenediamine; diglycidyl dihydroxy naphthalene; triglycidyl ethers of p-aminophenol (e.g. MY 0510; Hunstman); diglycidyl ethers of bisphenol A (DGEBA) based materials such as 2,2-bis(4,4'-dihydroxy phenyl) propane (e.g. DER 661 (Dow), or Epikote 828 (Hexion)) and higher molecular weight diglycidyl ethers of bisphenol A based materials such as those with an epoxy equivalent weight of 400-3500 g/mol (e.g. Epikote 1001 and Epikote 1009); glycidyl ethers of phenol novolak (or novolac) resins (e.g. DEN 431 or DEN 438; Dow); diglycidyl 1,2-phthalate (e.g. GLY CEL A-100); diglycidyl derivative of dihydroxy diphenyl methane (bisphenol F) (e.g. PY 306; Hunstman). Other epoxy resin precursors include cycloaliphatics such as 3',4'-epoxycyclohexyl-3,4-epoxycyclohexane carboxylate (e.g. CY 179; Hunstman).

In certain embodiments, the thermosetting resin is selected from resins which comprise an epoxy phenol novolac (EPN) resin in combination with a difunctional epoxy resin. In one embodiment, the difunctional epoxy resin is a bisphenol A epoxy resin, preferably diglycidyl ether of bisphenol A (DGEBA).

In some embodiments, the thermosetting resin exhibits an EEW (epoxy equivalent weight) of at least about 90 g/mol, for example at least about 100 g/mol, and typically no more than about 400 g/mol, for example no more than about 300 g/mol. In certain embodiments, the curable resin exhibits an EEW (epoxy equivalent weight) of at least about 150 g/mol and at most 250 g/mol.

In one embodiment, the thermosetting resin comprises, or even consists (essentially) of resins comprising vinyl groups, such as vinyl ester resins or urethane acrylate resins. Such resins may, in some cases, be referred to as "vinyl hybrid resins." Vinyl ester resins are typically the reaction products of epoxy resins and monofunctional ethylenically unsaturated carboxylic acids or anhydrides. Exemplary epoxy resins for inclusion in a vinyl ester resin include, but are not limited to, diglycidyl ether of bisphenol A and higher homologues thereof, the diglycidyl ether of tetrabromobisphenol A, epoxylated phenolformaldehyde novolac, and polypropylene oxide diepoxide—for example epoxylated bisphenol A-epichlorohydrin and epoxylated phenolformaldehyde novolac. The carboxylic acid or anhydride can be any organic carboxylic acid or anhydride. Examples include acrylic acid, methacrylic acid, maleic acid or anhydride, succinic anhydride, fumaric acid, phthalic acid or anhydride, isophthalic acid, terephthalic acid, adipic acid, polyadipic anhydride, fatty acids, and mixtures of two or more thereof. The acid-epoxide reaction can be catalyzed by tertiary amines, phosphines, alkalis, or onium salts.

Examples of commercially available vinyl ester resins include Derakane™ 780, a product of Dow identified as a solution of an acid functionalized novolac vinyl ester resin dissolved in styrene monomer, Derakane™ 470-36, a product of Dow identified as an epoxy novolac vinyl ester resin dissolved in styrene monomer, and Derakane™ 411-45, a product of Dow identified as a solution of an epoxy vinyl ester resin dissolved in monomeric styrene. Additional vinyl ester resins include the Advalite™ family of resins, products of Reichhold identified as vinyl hybrid resins that are either (monomer free) hot melt resins or (styrene free) liquid resins.

Curatives

As used herein, the term "curative" refers to a compound that effects, or assists in, the hardening of the curable resin, and hence the term "curative" generally includes catalysts, accelerators and hardeners (including stoichiometric hardeners). In some preferred embodiments, the curable resin comprises one or more curatives selected from imidazole curatives, (poly)amine and substituted (poly)amine curatives, peroxide curatives and mixtures thereof. The type of curative is typically chosen based on the type of thermosetting resin utilized. For example, imidazole curatives, (poly)amine and substituted (poly)amine curatives, are typically used with epoxy resins and peroxide curatives are typically used with vinyl-containing resins.

Exemplary imidazole curatives include substituted imidazoles, preferably wherein the substituent groups of said substituted imidazoles are or comprise alkyl and/or aryl substituent groups. Suitable substituted imidazoles include 6-(2-(2-methyl-1H-imidazol-1-yl)ethyl)-1,3,5-triazine-2,4-diamine, 1-((2-methyl-1H-imidazol-1-yl)methyl)naphthalen-2-ol, 3-(2-phenyl-1H-imidazol-1-yl)propanenitrile, (2-phenyl-1H-imidazole-4,5-diyl)dimethanol, bis(2-ethyl-5-methyl-1H-imidazol-4-yl)methane, 6-[2-(2-ethyl-4-methylimidazol-1-yl)ethyl]-1,3,5-triazine-2,4-diamine, 1H-imidazole, 2-methyl-1H-imidazole, 2-undecyl-1H-imidazole, 1,2-dimethylimidazole, 2-ethyl-4-methylimidazole, 2-undecyl-4-methylimidazole, 1-benzyl-2-methylimidazole, 1-benzyl-2-phenylimidazole, 2-Phenylimidazole, 2-phenyl-4-methylimidazole, 2-heptadecyl-1H-imidazole, 6-(2-(2-methyl-1H-imidazol-1-yl)ethyl)-1,3,5-triazine-2,4-diamine, 2-phenyl-4,5-dihydroxymethylimidazole, 2-phenyl-4-methyl-5-hydroxymethylimidazole, 2-phenyl-4-hydroxymethyl-5-methylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct dihydrate, 2-Phenylimidazole isocyanuric acid adduct, 2,3-dihydro-1H-pyrrolo[1,2-a]benzimidazole, 1-dodecyl-2-methyl-3-benzylimidazolium chloride, 2-phenylimidazoline, 2,4-Diamino-6-vinyl-1,3,5-triazine, 2,4-Diamino-6-vinyl-1,3,5-triazine isocyanuric acid adduct, 2,4-Diamino-6-methacryloyloxyethyl-1,3,5-triazine, N1,N6-bis[2-(2-methyl-1H-imidazol-1-yl)ethyl]-hexanediamide, N,N'-Bis(2-methylimidazolyl-1-ethyl)urea, and mixtures thereof.

Exemplary (poly)amine and substituted (poly)amine curatives suitably have molecular weights of up to about 200 per amino group, and may include aromatic amines, guanidine derivatives, and urone or urea derivatives. Suitable diamines include, for example, 1,3-diaminobenzene, 4,4'-diaminodiphenylmethane, 4,4'-diaminodiphenyl sulphone (4,4' DDS), 3,3'-diaminodiphenyl sulphone (3,3' DDS), bis(4-amino-3,5-dimethylphenyl)-1,4-diisopropylbenzene, bis(4-aminophenyl)-1,4-diisopropylbenzene, 4-chlorophenyl-N,N-dimethyl-urea, 3,4-dichlorophenyl-N,N-dimethyl-urea, 2,6- and 2,4-toluene bis dimethyl urea, dicyandiamide, 4,4'-methylene-bis(phenyldimethylurea), cyanamide, methylene diphenyl diisocyanate (MDI) based ureas and mixtures thereof. In some embodiments, the curative used in connection with the present invention is a combination of a substituted imidazole curative and a diamine curative.

Exemplary peroxide curatives include organic acyl peroxides, peroxy carbonates, peroxyesters, peroxyketals, and (alkyl)peroxides. Suitable peroxides include, for example, dibenzoyl peroxide, di-t amyl peroxide, di-t butyl peroxide, dicumyl peroxide, t-butyl peroxy-2-ethylhexyl carbonate, t-amyl peroxy-2-ethylhexyl carbonate, di-(4-t-butyl cyclohexyl)-peroxydicarbonate, t-butyl peroxybenzoate, t-butyl peroxyacetate, t-butyl peroxy-2-ethylhexanoate, t-butyl peroxy-3,5,5-trimethylhexanoate, t-butyl monoperoxymaleate, t-amyl peroxybenzoate, ethyl-3,3-di(t-butylperoxy) butyrate, 1,1-di-(t-butylperoxy) cyclohexane, 1,1-di-(t-butylperoxy)-3,3,5-trimethylcyclohexane, 1,1-di-(t-amylperoxy) cyclohexane, 2,5-dimethyl-2,5-di-(2-ethylhexanoylperoxy)hexane, tert-butylperoxy isopropyl carbonate, 2,2-bis(tert-butylperoxy)butane, tert-butyl peracetate and mixtures thereof.

In some embodiments, the curatives used in connection with the present invention are solid curatives. Solid curatives are curatives which remains solid until at least about 150° C., e.g., at least about 170° C., or even at least about 190° C., under atmospheric pressure. The solid curatives are used in the solid state and remain in the form of a solid during and after combining with any other ingredients that form the curable resin, prior to curing. When in solid form, such curatives are suitably present in particulate or powder form. In some embodiments, the curatives of the present invention comprise a mixture of a solid curative and a liquid curative. Liquid curatives are used in the liquid state and remain in the form of a liquid during and after combining with any other ingredients that form the curable resin, prior to curing. In still other embodiments, the curatives used in connection with the present invention are liquid curatives.

The curable resin generally comprises said curative(s) in an amount of from about 1 wt % to about 15 wt %, for example from about 1.5 wt % or 2.0 wt % to about 10 wt % or even from about 3 wt % to about 7 wt % based on the total weight of the curable resin.

Thermoplastic Additives

The curable resin comprises one or more thermoplastic additives. Without wishing to be bound by any particular theory, it is believed that the thermoplastic additive significantly enhances the ability to handle the curable resin, while minimally impacting the cure conversion profile and glass transition temperature. Thermoplastic additives include polyarylethersulfones, polysulfones, polyvinylformals such as vinylec E or vinylec K, polymethylmethacrylates, polybutylacrylate-co-methylmethacrylate copolymers, polyimides, polyetherimides, phenoxy resins, modified butadiene nitrile polymers and polyamides. In one embodiment, the curable resin comprises a polyarylethersulfone. In another embodiment, the curable resin comprises a polyvinylformal resin. In still another embodiment, the curable resin comprises a phenoxy resin. In still another embodiment, the curable resin comprises a polyamide resin.

Generally speaking, the curable resin comprises one or more thermoplastic additives in an amount of from about 2 wt % to about 10 wt %. For example, in some embodiments, the curable resin comprises from about 2 wt % to about 8 wt %, or even from about 4 wt % to about 7 wt %. For the sake of clarity, the weight percentages of thermoplastic additives refer to the total amount of thermoplastic additive (i.e., in combination, if such combination is present).

Additional Additives

The curable resin may further contain conventional additives. In some embodiments, the curable resin comprises additional toughening agents, fillers or stabilizers. Suitable toughening agents include, for example, particulate toughening agents and aggregates such as glass beads, rubber particles and rubber-coated glass beads. Suitable fillers include, for example, polytetrafluoroethylene, silica, graphite, boron nitride, mica, talc and vermiculite, pigments, nucleating agents, clays, flame retardants such as alumina trihydrate (ATH) and magnesium hydroxide (MDH). Suitable stabilisers include phosphates. Additives may further include core-shell rubbers, such as core-shell rubbers in Kaneka's ACE MX product range, and liquid rubbers having reactive groups. The total amount of said additives in the curable resin is such that said additives constitute typically no more than about 10 wt %, more typically no more than about 5 wt %, by total weight of the pre-preg.

In some embodiments, the curable resin does not contain a cure inhibitor. For example, in some embodiments, the curable resin does not contain a cure inhibitor which is or comprises boric acid (including derivatives thereof such as metaboric acid and boric anhydride), a Lewis acid derivative of boron such as an alkyl borate or an alkyl borane or trimethoxyboroxine, a mineral acid having a nucleophilicity value "n" (as measured in C. G. Swain and C. B. Scott in J. Am, Chem. Society, Vol. 75, p 141 (1953)) of greater than zero and less than 2.5 (for example perchloric acid or tetrafluoroboric acid, fluoroarsenic acid, fluoroantimonic acid, fluorophosphoric acid, chloroboric acid, chloroarsenic acid, chloroantimonic acid chlorophosphoric acid, chloric acid, bromic acid, iodic acid and any combination thereof), or an organic acid having a pKa value of from 1 to 3 (such as salicylic acid, oxalic acid and maleic acid and mixtures thereof).

Properties of the Curable Resin

The glass transition temperature (Tg) of the curable resin, when cured, is in the range of from about 130° C. to about 200° C. In some embodiments, the glass transition temperature (Tg) of the curable resin, when cured, is from about 150° C. to about 200° C., or even from about 160° C. to about 180° C. In some embodiments, the curable resins have cure temperatures that are no more than 20° C. greater than, e.g., no more than 10° C. greater than, the Tg of the curable resin, when cured. In some embodiments, the curable resins have cure temperatures that are no more than, and preferably less than, the Tg of the curable resin, when cured. It will be appreciated that these Tg values refer to the cured resin when in a state of cure defined by a cure conversion of at least 95%.

The curable resin of the present invention exhibits a cure conversion (measured as described herein) of at least 95% when cured for a duration of no more than 10 minutes (e.g., in some embodiments no more than 8 or even no more than 5 minutes) at a temperature of no more than 10° C. above the Tg of the curable resin when cured. Generally, "95% cure conversion" defines a material where a sufficient majority of the reactive sites have been consumed, such that the mechanical and thermal characteristics of the cured material are within suitable characteristic ranges for that material. While it is possible to obtain additional curing with additional time, this will typically not result in significant mechanical or thermal improvement. In some embodiments, the curable resin of the present invention exhibits a cure conversion of at least 95% (e.g., in some embodiments at least 98%) when cured at a cure temperature in the range of from about 120° C. to about 175° C., wherein the cure cycle has a duration of no more than 10 minutes (e.g., in some embodiments no more than 8 minutes or even no more than 5 minutes).

In many conventional prior art resin systems where relatively high mold temperatures are used to obtain rapid cure times, the cure temperature is significantly higher (for instance at least 20° C. or at least 10° C. more) than the Tg of the cured resin. While the resin component is fully cured under these conditions, it is too soft to be removed from the mold (for instance without posing a high risk of distortion), and it is necessary to cool the mold to below the Tg of the cured resin before removing the cured component from the mold. Such a cooling step is an additional, undesirable step which increases the time required to produce a component, lowers the number of components that can be produced by a mold during a work cycle, and undesirably increases costs. Accordingly, in some embodiments, the curable resin of the present invention exhibits a cure conversion (measured as described herein) of at least 95% when cured for a duration of no more than 10 minutes (e.g., in some embodiments no more than 8 or even no more than 5 minutes) at a temperature less than the Tg of the curable resin when cured. In such embodiments, it would be possible to demold the cured resin when the mold is still hot—thus decreasing the time and costs associated with producing the cured component.

In some embodiments, the curable resin exhibits an uncured glass transition temperature (Tg) of less than 8° C. In further embodiments, the curable resin exhibits an uncured glass transition temperature (Tg) of less than 6° C., or even less than 3° C. In still further embodiments, the curable resin exhibits an uncured glass transition temperature (Tg) of at least about −6° C.

In some embodiments, the curable resin exhibits a viscosity at 21° C. of less than 1,500,000 Pa·s. It is noted, however, that measuring viscosity at a single temperature and shear rate only provides a small portion of the full picture related to the rigidity and integrity of a material. Instead, a variety of oscillatory shear testing can more adequately define the material by measuring the complex modulus (G*), the elastic (or storage) modulus (G'), the viscous (or loss) modulus (G"), and the Phase angle (δ). In particular, the phase angle and complex modulus together can define a viscoelastic map (as shown below and reproduced from http://www.rheologyschool.com), which, from left to right, distinguishes between elastic solids and viscous liquids and, from top to bottom distinguished between high and low rigidity or viscosity.

Accordingly, in some embodiments, the curable resins of the present invention exhibit a complex modulus (G*) of between about 100 and about 10,000,000 Pa·s between 20° C. and 60° C. For example, in some embodiments, the curable resins of the present invention exhibit a complex modulus (G*) of between about 1,000 Pa·s and about 5,000,000 Pa·s, or between about 4,000 Pa·s and about 4,000,000 Pa·s. The complex modulus is essentially a measure of how difficult it is to deform a material, e.g., a measure of flex/drapeability. A workable range for the complex modulus (G*) is defined by a pre-preg that is not too flaccid to be handled, nor too rigid to be useful.

The curable resins of the present invention exhibit a phase angle of between 50° and 87°, and preferably between 70° and 85°, when heated from 20° C. to 60° C. As used herein, the language "exhibit(s) a phase angle between A and B when heated from X to Y" means that the phase angle remains between A and B for the temperature range between X and Y. In some embodiments, the curable resins of the present invention exhibit a phase angle of between 72° and 84° when heated from 20° C. to 60° C. In some embodiments, the phase angle exhibited by the curable resins of the present invention peaks at between 72° and 84° when heated from 20° C. to 60° C., followed by a decrease in phase angle within the same 20° C. to 60° C. range. In some embodiments, the phase angle exhibited by the curable resins of the present invention peaks at between 72° and 84° when heated from 20° C. to 60° C., followed by a decrease in phase angle of at least about 2° within the same 20° C. to 60° C. range. In some embodiments, the phase angle exhibited by the curable resins of the present invention peaks at between 76° and 84° when heated from 20° C. to 60° C., followed by a decrease in phase angle of at least about 4° within the same 20° C. to 60° C. range. In sum, the curable resins of the present invention unexpectedly exhibit excellent handling characteristics at normal and elevated laminating temperatures.

In some embodiments, the curable resins of the present invention exhibit a phase separation during the temperature range. Without wishing to be bound by theory, it is believed that the thermoplastic additive dissolves in the base resin (which reduces the phase angle), but tends to partially phase separate upon cooling. This phase separation may allow for a flatter phase angle trace over temperature, instead of simply increasing with increased temperature (as in conventional resin formulations).

In some embodiments, the curable resins of the present invention exhibit an elastic (or storage) modulus (G') of between about 500 Pa and about 6,000,000 Pa at 20° C., e.g., between about 1,000 Pa and about 4,000,000 Pa at 20° C. or even between about 2,000 Pa and about 2,000,000 Pa at 20° C. In some embodiments, the curable resins of the present invention exhibit an elastic (or storage) modulus (G') of between about 10 Pa and about 2,500 Pa at 60° C., e.g., between about 25 Pa and about 1,000 Pa at 60° C. The Dahlquist criterion, which is derived from the conclusion that tack is a modulus-controlled process, specifies that tack does not occur when the adhesive storage modulus is greater than $10^5$ Pa. However, in some embodiments, the curable resins of the present invention exhibit tack even with a storage modulus of greater than $10^5$ Pa.

In some embodiments, the curable resins of the present invention exhibit a viscous (or loss) modulus (G") of between about 6 Pa and about 10,000,000 Pa at 20° C., e.g., between about 8 Pa and about 8,000,000 Pa at 20° C. In some embodiments, the curable resins of the present invention exhibit a viscous (or loss) modulus (G") of between about 100 Pa and about 5,000 Pa at 60° C., e.g., between about 200 Pa and about 1,800 Pa at 60° C.

Exemplary Curable Resin Formulations

While it is possible to derive other formulations exhibiting the properties described herein, some embodiments include compositions comprising:
 about 70% to about 90% of a mixture of difunctional and/or multifunctional thermosetting epoxy resins,
 about 5% to about 10% of a curative selected from substituted imidazoles, ureas, urones and mixtures thereof; and
 about 3% to about 7% of a thermoplastic additive selected from phenoxy resins, polyvinylformal resins, polyethersulfone resins, and mixtures thereof.

Other embodiments include compositions comprising:
 about 70% to about 99% of a vinyl ether resin or a mixture of vinyl ether resins,
 about 1% to about 4% of a curative selected from organic acyl peroxides, peroxy carbonates, peroxyesters, peroxyketals, peroxides and mixtures thereof; and
 about 3% to about 7% of a thermoplastic additive selected from phenoxy resins, polyvinylformal resins, polyethersulfone resins, and mixtures thereof.

All percentages listed above are weight percent versus the total weight of the curable resin. Exemplary formulations are described below in Tables 1-5.

TABLE 1

Exemplary Formulation

| Ingredient | % |
| --- | --- |
| Bisphenol A diglycidyl ether (DGEBA) as solid, liquid or a combination thereof | 25-35% |
| Epoxy phenol novolac | 50-60% |
| Phenoxy Resin | 3%-7% |
| Dicyandiamide (DICY) | 3%-7% |
| Substituted urea catalyst | 2%-6% |

TABLE 2

Exemplary Formulation

| Ingredient | % |
| --- | --- |
| Bisphenol A diglycidyl ether (DGEBA) as solid, liquid or a combination thereof | 60%-70% |
| Tetrafunctional epoxy resin | 15-25% |
| Polyvinylformal resin | 1%-3% |
| Polyethersulfone | 1%-3% |
| Dicyandiamide (DICY) | 3%-7% |
| Solid disubstituted imidazole curative, e.g., 6-(2-(2-methyl-1H-imidazol-1-yl)ethyl)-1,3,5-triazine-2,4-diamine | 1%-4% |
| Substituted urea catalyst | 1%-4% |

TABLE 3

Exemplary Formulation

| Ingredient | % |
| --- | --- |
| Epoxy phenol novolac | 65%-75% |
| Polyvinylformal resin | 3%-7% |
| Solid epoxy resin | 4%-8% |
| Dicyandiamide (DICY) | 3%-7% |
| Bisphenol A diglycidyl ether (DGEBA) as solid, liquid or a combination thereof. | 5%-15% |
| Solid disubstituted imidazole curative, e.g., 6-(2-(2-methyl-1H-imidazol-1-yl)ethyl)-1,3,5-triazine-2,4-diamine | 1%-4% |
| Pigment | 0.01%-1% |

TABLE 4

Exemplary Formulation

| Ingredient | % |
| --- | --- |
| Bisphenol A diglycidyl ether (DGEBA) as solid, liquid or a combination thereof. | 45%-60% |
| Additional multifunctional epoxy resin, e.g., tetrafunctional epoxy resin | 25-40% |
| Polyethersulfone | 3%-7% |
| Dicyandiamide (DICY) | 3%-7% |
| Solid disubstituted imidazole curative, e.g., 1-(cyanoethyl)-2-ethyl-4-methylimidazole | 2%-5% |

TABLE 5

Exemplary Formulation

| Ingredient | % |
| --- | --- |
| Bisphenol A diglycidyl ether (DGEBA) as solid, liquid or a combination thereof. | 30%-50% |
| Additional multifunctional epoxy resin, e.g., tetrafunctional epoxy resin | 40%-60% |
| Polyvinylformal resin, e.g., vinylec K | 2%-5% |
| Dicyandiamide (DICY) | 3%-7% |
| Substituted urea catalyst | 1.5%-3.5% |

TABLE 6

Exemplary Formulation

| Ingredient | % |
| --- | --- |
| Vinyl hybrid hot melt resin | 60%-80% |
| Vinyl hybrid liquid resin | 15%-25% |
| Polyvinylformal resin, e.g., vinylec K | 4%-7% |
| Peroxyester | 1.5%-2.2% |

TABLE 7

Exemplary Formulation

| Ingredient | % |
| --- | --- |
| Vinyl hybrid hot melt resins (e.g., more than one, in combination) | 54%-66% |
| Vinyl hybrid liquid resin | 25%-35% |
| Polybutylacrylate-co-methylmethacrylate copolymer | 4.5%-7.5% |
| Peroxyester | 1.5%-2.2% |

Pre-Pregs

The present invention also includes pre-pregs of fiber-reinforced curable composite materials. The pre-pregs of the present invention comprise or consist of one or more layer(s) of reinforcing fibers impregnated with a curable resin as defined in detail herein. Preferably, the layer(s) of reinforcing fibers are impregnated with said curable resin. As used herein, the term "impregnated" means that the curable resin is present throughout the cross-section of the pre-preg, i.e. the curable resin is present in interstices between the reinforcing fibers or bundles of reinforcing fibers throughout the cross-section of the pre-preg.

In the present disclosure, the proportions of the various components are such that the amount of reinforcing fibers plus the amount of curable resin equals 100%. It will be appreciated that reference to the "curable resin" in this context includes the curable resin components themselves, the curative(s) and the optional additives described hereinabove.

Pre-pregs of the present invention typically comprise from about 30 to about 80% of curable resin, wherein the percentages refer to volume percent of the curable resin, by total volume of the pre-preg. For example, the pre-preg may contain from about 30 to about 65%, or from about 45% to about 55%, of the curable resin. In some embodiments, the pre-preg comprises at least about 40% of the curable resin. In some embodiments, the pre-preg comprises no more than about 65%, or no more than about 60%, of the curable resin. Where the reinforcing fibers are selected from carbon fiber, the pre-preg typically comprises from about 30 to about 65 wt % of curable resin by total weight of the pre-preg, for example, from about 40 to about 55 wt % of curable resin by total weight of the pre-preg. The narrower and narrowest ranges of resin fractions are particularly advantageous for achieving the desired permeability characteristics described herein.

In some embodiments, the pre-preg exhibits an areal weight of from about 100 to about 1000 $g/m^2$, for example from about 100 to about 750 $g/m^2$, from about 200 to about 500 $g/m^2$, or even from about 250 to about 650 $g/m^2$. Areal weights within the recited ranges are particularly appropriate for pre-pregs in which the reinforcing fibers are selected from carbon fiber. It will be understood that the areal weight of the pre-preg includes the weight of the reinforcing fibers and the curable resin (i.e. including the curative(s) and any optional additives contained therein).

In some embodiments, the thickness of the pre-preg is no more than about 1500 µm, e.g., no more than about 1000 µm, or in some embodiments no more than about 500 µm. In other embodiments, the thickness of the pre-preg is based on the number of plys in the material. For example, in some embodiments, the thickness of the pre-preg is between about 15 µm, and about 450 µm per ply.

Fibers

As used herein, the term "fiber" has its ordinary meaning as known to those skilled in the art and may include one or more fibrous materials adapted for the reinforcement of composites, which may take the form of any of particles, flakes, whiskers, short fibers, continuous fibers, sheets, plies, and combinations thereof. In certain embodiments, the fibers are arranged as a fiber pre-form. As used herein, "fiber pre-form" refers to an assembly of fibers, layers of fibers, fabric or layers of fabric plies configured to receive a liquid curable resin in a resin infusion process. In some embodiments, the fibers in a reinforcing fiber layer are in the form of continuous fibers, filaments, tows, bundles, sheets, plies, or combinations thereof. The precise specification of the fibers, for instance their orientation and/or density, can be specified to achieve the optimum performance for the intended use of the pre-pregs. Continuous fibers may adopt any of unidirectional (aligned in one direction), multi-directional (aligned in different directions), non-woven, woven, knitted, stitched, wound, twisted, untwisted and braided configurations. In certain preferred embodiments, the reinforcing fibers are in the form of untwisted bundles of continuous filaments. Woven fiber structures may comprise a plurality of woven tows, each tow composed of a plurality of filaments. In further embodiments, the tows may be held in position by cross-tow stitches, weft-insertion knitting stitches, or a small amount of resin binder, such as a thermoplastic resin. In one embodiment, the layer(s) of reinforcing fibers used in the present invention comprise woven fiber structures comprising a plurality of woven tows arranged substantially orthogonally. In a further embodiment, the layer(s) of reinforcing fibers used in the present invention comprise fiber structures wherein the fibers are arranged unidirectionally. In a further embodiment, the layer(s) of reinforcing fibers used in the present invention comprise fiber structures wherein the fibers are arranged in other orientations, such as tri-axial wherein fibers are arranged in three directions, such as 0°, +60°, −60°.

The reinforcing fibers are selected from, but not limited to, glass fibers (including Electrical or E-glass), carbon fibers (particularly graphite), aramid, synthetic polymer fibers (such as aromatic polyamide fibers, polyimide fibers, polybenzoxazole fibers, high-modulus polyethylene (PE) fibers and polyester fibers), boron fibers, quartz fibers, basalt fibers, ceramic fibers (such as silicon carbide fibers), and combinations thereof. In one embodiment, the fibers comprise carbon fibers, glass fibers, or a combination thereof. Carbon fiber is particularly suitable. In one embodiment, the fibers comprise carbon fibers that exhibit a tensile strength of greater than or equal to 3.5 GigaPascals ("GPa") and a tensile modulus of greater than or equal to 200 GPa. For the fabrication of high-strength composite materials, e.g. for aerospace and automotive applications, it is preferred that the reinforcing fibers have a tensile strength of greater than 3.5 GPa.

Pre-pregs of the present invention typically comprise from about 20 to about 70% reinforcing fibers, wherein the percentages refer to the volume percent of the fiber by total volume of the pre-preg. For example, the pre-preg may contain from about 35 to about 70%, or from about 45% to about 60% reinforcing fibers. In some embodiments, the pre-preg comprises no more than about 60% reinforcing fibers. In some embodiments, the pre-preg comprises at least about 35%, at least about 40%, or at least about 45% reinforcing fibers. Where the reinforcing fibers are selected from carbon fiber, the pre-preg typically comprises from about 40 to about 80 wt % reinforcing fibers, by total weight of the pre-preg. For example, the pre-preg may contain from about 45 to about 70 wt %, from about 55% to about 70 wt %, or from about 56 to about 68 wt %, by total weight of the pre-preg. In some embodiments, the pre-preg comprises no more than 75 wt %, e.g., no more than about 70 wt %, reinforcing fibers by total weight of the pre-preg. The narrower and narrowest ranges of reinforcing fiber fractions are particularly advantageous for achieving the desired permeability characteristics described herein.

Manufacturing

The pre-pregs of the present invention are manufactured by any suitable technique known in the art, such that the curable resin described herein is contacted with the fibrous reinforcing agent in one or more of the forms noted above under conditions of temperature and pressure sufficient to cause the curable resin to flow and infuse or impregnate the fibers. The term "impregnate" refers to the introduction of a curable resin to reinforcement fibers so as to introduce the curable resin between the interstices of the fibers and/or fully or partially encapsulate the fibers. Thus, the pre-preg of the present invention is prepared by the general method of:

providing a dry fiber pre-form comprised of one or more layers of reinforcing fibers; and
impregnating said dry fiber preform with the curable resin, wherein said curable resin is liquid.

In general terms, the dry fiber pre-form is impregnated with the curable resin by heating the curable resin to its molten state and disposing said molten curable resin on and into said dry fiber preform. Typical impregnating methods include:

(1) Continuously moving the reinforcing fibers through a bath of solvated resin composition to fully or substantially fully wet out the fibers; followed by the application of heat to evaporate the solvent; or
(2) Pressing top and/or bottom resin films against a web of reinforcing fibers under elevated temperature.

The resulting pre-preg is generally a pliable sheet of material, which is typically tacky, but may also exhibit low or no tack.

In some embodiments, the pre-preg is prepared by a hot-melt casting technique. The hot-melt pre-preg manufacturing process is disclosed in WO-2014/096435-A, which is incorporated herein by reference.

To form a molded article, a plurality of pre-pregs is laid up into or onto a mold (often referred to as molding tool) in a stacking arrangement to form a "pre-preg lay-up". The pre-preg plies within the lay-up may be positioned in a selected orientation with respect to one another. For example, pre-preg lay-ups may comprise pre-preg plies having uni-directional fiber arrangements, with the fibers oriented at a selected angle θ, e.g., 0°, 45°, or 90°, with respect to the largest dimension (typically defined as the length) of the lay-up. Once in place, the pre-pregs in the lay-up are cured as described hereinbelow.

The layup process can be an automated process. Automated handling of fiber-reinforced composite materials (including pre-pregs) is known, e.g., in US 2005/0042323 or U.S. Pat. No. 7,341,086, the disclosure of which is incorporated herein by reference. However, in some embodiments, the layup process may be fully or partially manual. For example, the layup process may be a hand layup process. In some embodiments, the layup process may include cross-plying, repositioning, pad-ups or ply-drops, preforming, laminating onto a tool, or any combination thereof.

There is also provided herein, a process for the production of a molded article from a plurality of pre-pregs, the process including:

(a) disposing a pre-preg into or onto a mold;
(b) repeating step (a) at least once to dispose one or more further pre-pregs into or onto said mold; and
(c) curing the plurality of pre-pregs, e.g., by thermally curing;

wherein said pre-preg comprises the curable resin and the reinforcing fiber as each defined herein.

In some embodiments, this process is a press-molding process. In some embodiments, this process is an automated process. The process may also be an automated press-molding process.

The pre-preg can be provided in the form of a wound roll of the pre-preg material (typically wound around a core of cardboard or other suitable material). The process of producing a molded article, therefore, may further comprise the step of unwinding the pre-preg material onto a flat and level base and suitably securing the pre-preg material in position by a suitable securing means as is conventional in the art. One or more pre-determined shapes can also be cut from the web of pre-preg material, optionally using a mechanized and automated cutting means, as known in the art. One suitable cutting means is a high-frequency rotationally operating oscillating saw blade. During the cutting step, the web of pre-preg may be supported and retained in place by a suitable retaining member. The pre-determined cut shape remains in the plane of the web of the remaining pre-preg material. The pre-preg (or the pre-determined cut pre-preg shape) is then conveyed into or onto the mold. Optionally, the cut pre-preg shape may be conveyed to a stacking position where the cut pre-preg shapes are stacked or wherein the cut pre-preg shapes are deposited in or on a release film or lay-up mold or mold loading device, and then conveyed into or onto said mold.

After the desired or pre-determined number of pre-pregs has been laid in or on the mold, the plurality of pre-pregs are cured. Although thermal curing is preferred, UV or light curing is also contemplated. In some embodiments, curing is effected while the pre-pregs are located in or on the mold, for example while the pre-pregs are compressed in a mold cavity, preferably a heated mold-cavity. In some embodiments, the heated mold-cavity is an isothermally heated mold cavity. Thus, curing can be effected in a press-molding process where the temperature of the molding surfaces of the mold is fixed at a pre-determined temperature (isothermal tooling) to cure the pre-pregs. Thus, when the pre-pregs are compressed by a mold (e.g., a mold tool or mold press), at least a portion of the pre-pregs is in contact with the desired and appropriate molding surface(s) of the mold. The pre-pregs are therefore heated as quickly as the mold allows. In other embodiments, the heated mold ramps up in temperature: beginning at ambient or slightly above ambient and increasing to a temperature suitable to cure the pre-preg. The mold temperature may optionally then be ramped down prior to or after the de-molding of the cured part.

In the present invention, thermal curing is generally conducted at a cure temperature (Tc) of at least 120° C., e.g., at least 140° C. In some embodiments, thermal curing is generally conducted at a cure temperature (Tc) of no more than 175° C., e.g., no more than 165° C. In some embodiments, thermal curing is generally conducted at a cure temperature (Tc) in the range of from about 120° C. to about 175° C., for example from about 140° C. to about 165° C. In certain embodiments, thermal curing is conducted at a cure temperature (Tc) which is no more than 20° C. greater than, e.g., no more than 10° C. greater than the Tg of the curable resin when cured. In certain embodiments, thermal curing is conducted at a cure temperature (Tc) which is no more than, and is preferably less than, the Tg of the curable resin when cured. In other words, in some cases Tc≤Tg+20° C., in some cases Tc≤Tg+10° C., and in some cases Tc≤Tg and more preferably Tc≤Tg. In some embodiments, thermal curing is conducted using a cure cycle having a duration of no more than 10 minutes, e.g., no more than 8 minutes, or even no more than 5 minutes. The cure cycle duration as defined herein is the period for which the plurality of pre-pregs is subjected to the pre-determined cure temperature and does not include the ramp phase or the cool-down phase.

In an alternative embodiment, thermal curing may be conducted in an oven or autoclave, and may be conducted under vacuum (for instance in a vacuum bag as known in the art), suitably conducted at elevated pressure. Suitable elevated pressures include pressures from about 2 to about 10 bar. In this embodiment, the cure temperatures and cure cycle durations described hereinabove are also applicable, but typically the heating and cooling rates are controlled. Typically, the heating rate during the ramp phase is from about 1 to about 5° C./min, more typically from about 1 to about 3° C./min. Typically, the cooling rate in the cool-down phase is from about 1 to about 5° C./min, more typically from about 1 to about 3° C./min to 60° C.

The process further comprises the step of removing the molded cured pre-preg(s) from the mold to provide the molded article. The curable resins of the present invention are particularly advantageous because they allow the molding process to dispense with the step of cooling the mold before removing the cured component therefrom. Indeed, in some embodiments of the present process, such process does not comprise the step of cooling the mold prior to removing the molded cured pre-preg(s) therefrom.

Molded articles prepared by the process described herein are particularly suitable as components for transport applications, and particularly the automotive industry. The term "automotive industry" herein is a particular reference to road transport vehicles, including cars, buses, trucks and motorcycles and the like. Automotive components prepared by the present invention are particularly suitable as mid- or high-volume automotive parts, particularly those where cost and speed of production are paramount. For example, components prepared by the present invention can include structural parts such as body or chassis components, e.g. spare wheel wells, body panels, boot lids, etc. Components prepared by the present invention can also include visual quality parts, such as hoods, roofs, rockers, splitters, spoilers, among others. The present invention provides a process which provides advantages of efficiency and economy. The lay-up time according to the present invention is significantly reduced, allowing a reduction in the unit cost per component and/or allowing the high volume of component production desired in the automotive industry. Moreover, the enhanced and consistent manipulability of the curable resin can allow for an easier, and potentially quicker, lay-up process.

Various embodiments of the invention are described herein. It will be recognized that features specified in each embodiment may be combined with other specified features to provide further embodiments.

EXEMPLIFICATION

The present teachings are further illustrated with reference to the following non-limiting examples.
Exemplary Materials
Exemplary commercially available material used in the following examples includes:

| Ingredient | Commercially available source |
| --- | --- |
| Epoxy phenol novolac | Epikote ® 154 |
| Epoxy phenol novolac | Araldite ® EPN1138 |
| Tetrafunctional epoxy resin | Araldite ® MY 9512 |
| Phenoxy resin | YD50 |
| Polyvinyl formal resin | Vinylec E or Vinylec K |
| Dicyandiamide (DICY) | Dyhard ® 100SF |
| Dicyandiamide (DICY) | Dyhard ® DF50EP (50% dispersed in a 50% Bisphenol-A epoxy resin) |
| Bisphenol A diglycidyl ether (DGEBA) | Araldite ® LY1556 (liquid) |
| Bisphenol A diglycidyl ether (DGEBA) | Araldite ® GT7071 (solid) |
| Substituted urea catalyst | Dyhard ® UR505 |
| Substituted urea catalyst | Omicure ® U-24 |
| 6-(2-(2-methyl-1H-imidazol-1-yl)ethyl)-1,3,5-triazine-2,4-diamine | Curesol ® 2MZ Azine S |
| 1-(cyanoethyl)-2-ethyl-4-methylimidazole | Curimid ® CN |
| Pigment | WS17321A |
| Vinyl hybrid hot melt resin | Advalite ™ 35000-00 |
| Vinyl hybrid hot melt resin | Advalite ™ 35051-00 |
| Vinyl hybrid hot melt resin | Advalite ™ X4710-16 |
| Vinyl hybrid liquid resin | Advalite ™ 35060-00 |
| Vinyl hybrid liquid resin | Advalite ™ 35065-00 |
| Polybutylacrylate-co-methylmethacrylate copolymer | Nanostrength ™ M22N |
| Peroxyester | Luperox ® 270 |
| Peroxyester | Trigonox ® 21S |

Measurement Methods
The pre-pregs described herein were characterized as follows.
Viscosity
The viscosity of the resins was measured as a temperature sweep using a thermo HAAKE MARS rheometer in oscillation mode unless otherwise stated, by following ASTM D4440-15: using an 8 mm diameter parallel plate, with a strain of 1%, a frequency of 1 Hz and a gap of 500 μm. Values for complex modulus (G*), elastic (or storage) modulus (G'), viscous (or loss) modulus (G"), and phase angle (δ) are derived from the viscosity data measured according to this method.
Glass Transition Temperature
The glass transition temperature, $T_g$, of the cured resins was measured by Dynamic Mechanical Analysis (DMA)

using a dynamic mechanical analyser (TA Instruments Q800) under flexural oscillation mode according to ASTM 7028-07, with a heating rate of 5° C./min and without purge gas. The thermocouple in the TA Instruments Q800 equipment remained in its fixed position. The dimensions of the sample were 58±5×10±1×1.75±0.75 mm (Length×Width×Thickness). The Tg reported herein is the intercept of the two tangent lines (i.e. the Lines "A" and "B" referred to in ASTM 7028-07) from the plot of storage modulus on a linear scale vs. temperature.

The uncured glass transition temperature, $T_g$, of the resins was measured by differential scanning calorimetry (DSC) at a heating rate of 10° C. per minute, according to ISO 11357-2:2013, on a TA Instruments Q2000 differential scanning calorimeter.

Cure Conversion

Differential Scanning calorimetry (DSC) was utilized to determine the cure conversion under a given set of cure conditions, substantially in accordance with ISO-11357-5:2013. The residual enthalpy (remaining heat of reaction) detected during the DSC measurement is correlated to the total enthalpy (heat evolved) of the curing reaction. DSC measurements are performed by heating a sample from 30° C. to a temperature that is sufficient to capture the entire curing reaction (225° C. is typically sufficient for the resins described herein) at a heating rate of 10° C./min. The sample size is about 5-10 mg. The cure conversion (%) is calculated as:

$$\text{cure coversion } (\%) = \frac{(\Delta Hi - \Delta He)}{\Delta Hi} \times 100$$

wherein:
ΔHi is the enthalpy generated by the uncured test sample during heating from 30° C. to 225° C.; and
ΔHe is the enthalpy generated by a cured sample during the heating scan of heated from 30° C. to 225° C.

Example 1

An epoxy resin formulation according to Table 8 below was prepared by mixing the first three ingredients at 170° C. for two hours under low shear. The mixture was cooled to 50° C., followed by the addition of the remainder of the materials. The resulting mixture was mixed for 10 minutes.

TABLE 8

| Epoxy resin formulation of Example 1 | |
|---|---|
| Ingredient | % |
| bisphenol A diglycidyl ether (DGEBA) | 29.48 |
| epoxy phenol novolac | 56.52 |
| phenoxy resin | 5.00 |
| dicyandiamide (DICY) | 5.00 |
| substituted urea catalyst | 4.00 |

A pre-preg was prepared from the epoxy resin formulation of Example 1 as follows: A carbon fibre fabric (2×2 twill weave; areal weight of 200 gsm) manufactured from a 3 k fibre (e.g., SM T300 3K from Toray®) was impregnated with the epoxy resin formulation of Example 1 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 150° C.

The viscosity of the resin formulation of Example 1 was analyzed as described above. The formulation according to Example 1 exhibits a phase angle of between 70° and 87° when heated from 20° C. to 60° C. Additional shear properties of the resin formulation of Example 1 are provided in Table 15, below.

Example 2

An epoxy resin formulation according to Table 9 below was prepared by mixing the first four ingredients at 170° C. for three hours under low shear. The mixture was cooled to 50° C., followed by the addition of the remainder of ingredients. The resulting mixture was mixed for 10 minutes.

TABLE 9

| Epoxy resin formulation of Example 2 | |
|---|---|
| Ingredient | % |
| bisphenol A diglycidyl ether (DGEBA) | 66.12 |
| tetrafunctional epoxy resin | 21.08 |
| polyvinyl formal resin | 1.70 |
| polyethersulfone | 1.70 |
| dicyandiamide (DICY) | 4.40 |
| 6-(2-(2-methyl-1H-imidazol-1-yl)ethyl)-1,3,5-triazine-2,4-diamine | 2.50 |
| substituted urea catalyst | 2.50 |

A pre-preg was prepared from the epoxy resin formulation of Example 2 as follows: A carbon fibre fabric (2×2 twill weave; areal weight of 200 gsm) manufactured from a 3 k fibre (e.g., SM T300 3K from Toray®) was impregnated with the epoxy resin formulation of Example 2 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 152° C.

The viscosity of the resin formulation of Example 2 was analyzed as described above. The formulation according to Example 2 exhibits a phase angle of between 70° and 87° when heated from 20° C. to 60° C. Additional shear properties of the resin formulation of Example 2 are provided in Table 15, below.

Example 3

An epoxy resin formulation according to Table 10 below was prepared by mixing the first four ingredients at 170° C. for two hours under low shear. The mixture was cooled to 50° C., followed by the addition of the remainder of ingredients. The resulting mixture was mixed for 10 minutes.

TABLE 10

| Epoxy resin formulation of Example 3 | |
|---|---|
| Ingredient | % |
| epoxy phenol novolac | 71.8 |
| polyvinyl formal resin | 5.0 |
| bisphenol A diglycidyl ether (DGEBA) | 9.9 |
| 540 eqWt Solid epoxy resin | 6.0 |

TABLE 10-continued

| Epoxy resin formulation of Example 3 | |
|---|---|
| Ingredient | % |
| dicyandiamide (DICY) | 4.5 |
| 6-(2-(2-methyl-1H-imidazol-1-yl)ethyl)-1,3,5-triazine-2,4-diamine | 2.7 |
| pigment | 0.1 |

A pre-preg was prepared from the epoxy resin formulation of Example 3 as follows: A carbon fibre fabric (2×2 twill weave; areal weight of 200 gsm) manufactured from a 3 k fibre (e.g., SM T300 3K from Toray®) was impregnated with the epoxy resin formulation of Example 3 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 170° C.

The viscosity of the resin formulation of Example 3 was analyzed as described above. The formulation according to Example 3 exhibits a phase angle of between about 74° and about 84° when heated from 20° C. to 60° C. Additional shear properties of the resin formulation of Example 3 are provided in Table 15, below.

Example 4

An epoxy resin formulation according to Table 11 below was prepared by mixing the first three ingredients at 170° C. for two hours under low shear. The mixture was cooled to 50° C., followed by the addition of the remainder of ingredients. The resulting mixture was mixed for 10 minutes.

TABLE 11

| Epoxy resin formulation of Example 4 | |
|---|---|
| Ingredient | % |
| bisphenol A diglycidyl ether (DGEBA) | 53.32 |
| tetrafunctional epoxy resin | 32.36 |
| polyethersulfone | 4.20 |
| dicyandiamide (DICY) | 6.30 |
| 1-(cyanoethyl)-2-ethyl-4-methylimidazole | 3.82 |

A pre-preg was prepared from the epoxy resin formulation of Example 4 as follows: A carbon fibre fabric (2×2 twill weave; areal weight of 200 gsm) manufactured from a 3 k fibre (e.g., SM T300 3K from Toray®) was impregnated with the epoxy resin formulation of Example 4 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 160° C.

The viscosity of the resin formulation of Example 4 was analyzed as described above. The formulation according to Example 4 exhibits a phase angle of between 70° and 87° when heated from 20° C. to 60° C. Additional shear properties of the resin formulation of Example 4 are provided in Table 15, below.

Example 5

An epoxy resin formulation according to Table 12 below was prepared by mixing the first three ingredients at 170° C. for two hours under low shear. The mixture was cooled to 50° C., followed by the addition of the remainder of ingredients. The resulting mixture was mixed for 10 minutes.

TABLE 12

| Epoxy resin formulation of Example 5 | |
|---|---|
| Ingredient | % |
| bisphenol A diglycidyl ether (DGEBA) | 39.51 |
| tetrafunctional epoxy resin | 50.13 |
| polyvinyl formal resin | 3.30 |
| dicyandiamide (DICY) | 4.40 |
| substituted urea catalyst | 2.65 |

A pre-preg was prepared from the epoxy resin formulation of Example 5 as follows: A carbon fibre fabric (2×2 twill weave; areal weight of 200 gsm) manufactured from a 3 k fibre (e.g., SM T300 3K from Toray®) was impregnated with the epoxy resin formulation of Example 5 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 178° C.

The viscosity of the resin formulation of Example 5 was analyzed as described above. The formulation according to Example 5 exhibits a phase angle of between 70° and 87° when heated from 20° C. to 60° C. Additional shear properties of the resin formulation of Example 5 are provided in Table 15, below.

Comparative Example 1

The formulation prepared in accordance with Example 8 of WO 2017/030988 was recreated, and included the formulation recited in Table 13:

TABLE 13

| Epoxy resin formulation of Comparative Example 1 | |
|---|---|
| Ingredient | % (wt) |
| epoxy phenol novolac | 61.30 |
| bisphenol A diglycidyl ether (DGEBA) | 30.62 |
| dicyandiamide (DICY) | 4.38 |
| 1-(cyanoethyl)-2-ethyl-4-methylimidazole | 2.65 |
| succinic acid | 0.95 |
| pigment | 0.10 |

A pre-preg was prepared from the epoxy resin formulation of Comparative Example 1 as follows:
A carbon fibre fabric (2×2 twill weave; areal weight of 200 gsm) manufactured from a 3 k fibre (e.g., SM T300 3K from Toray®) was impregnated with the epoxy resin formulation of Comparative Example 1 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of about 155° C.

The viscosity of the resin formulation of Comparative Example 1 was analyzed as described above. The formulation according to Comparative Example 1 did not exhibit a phase angle of between 70° and 87° when heated from 20° C. to 60° C. Additional shear properties of the resin formulation of Comparative Example 1 are provided in Table 15, below.

Comparative Example 2

A formulation was prepared in accordance with the examples of WO 2014/096435, and included the formulation recited in Table 14:

TABLE 14

Epoxy resin formulation of Comparative Example 2

| Ingredient | % |
| --- | --- |
| bisphenol A diglycidyl ether (DGEBA) | 64.65 |
| epoxy phenol novolac | 18.79 |
| phenoxy resin | 3.06 |
| dicyandiamide (DICY) | 9.00 |
| substituted urea catalyst | 4.50 |

A pre-preg was prepared from the epoxy resin formulation of Comparative Example 2 as follows:
A carbon fibre fabric (2×2 twill weave; areal weight of 200 gsm) manufactured from a 3 k fibre (e.g., SM T300 3K from Toray®) was impregnated with the epoxy resin formulation of Comparative Example 2 to obtain a prepreg with a resin content of 38%. The pre-preg was used to make an 8-ply 0/90° laminate which was then subjected to a 5 minute cure at a curing temperature of 160° C. The curing was performed in a steel-matched die tool pre-heated to the curing temperature. The resulting laminate was tested by DMA following ASTM 7028-07, and found to exhibit a Tg of between about 110° C. and 120° C.

The viscosity of the resin formulation of Comparative Example 2 was analyzed as described above. While the formulation according to Comparative Example 2 reaches a phase angle of between 70° and 87° when at some point in the range of 20° C. to 60° C., the phase angle is not between 70° and 87° in the entire 20° C. to 60° C. range. Additional shear properties of the resin formulation of Comparative Example 2 are provided in Table 15, below.

TABLE 15

Shear Properties of the resin formulations of the Examples at 20° C.

| | n*/Pa·s | G*/Pa | G'/Pa | G"/Pa | Phase angle/° |
| --- | --- | --- | --- | --- | --- |
| Example 1 | 1,740,000 | 10,913,750 | 2,519,250 | 10,623,750 | 76.71 |
| Example 2 | 3,900 | 24,511 | 7,796 | 23,235 | 71.45 |
| Example 3 | 413,500 | 2,598,124 | 325,400 | 2,577,666 | 82.81 |
| Example 4 | 1,650 | 12,635 | 3,519 | 12,135 | 73.83 |
| Example 5 | 47,170 | 366,725 | 66,030 | 360,731 | 79.62 |
| Comparative 1 | 214,650 | 1,348,438 | 118,740 | 1,343,200 | 84.95 |
| Comparative 2 | 3,232,625 | 20,311,250 | 7,170,999 | 19,001,250 | 69.39 |

Prospective Example

A vinyl hybrid formulation according to one of Tables 16 or 17 below will be prepared by mixing (for example, by first mixing the resins/copolymer followed by addition of the curative).

TABLE 16

First vinyl hybrid resin formulation of Prospective Example

| Ingredient | % |
| --- | --- |
| Vinyl hybrid hot melt resin | 60%-80% |
| Vinyl hybrid liquid resin | 15%-25% |
| Polyvinylformal resin, e.g., vinylec K | 4%-7% |
| Peroxyester | 1.5%-2.2% |

TABLE 17

Second vinyl hybrid resin formulation of Prospective Example

| Ingredient | % |
| --- | --- |
| Vinyl hybrid hot melt resins (e.g., more than one, in combination) | 54%-66% |
| Vinyl hybrid liquid resin | 25%-35% |
| Polybutylacrylate-co-methylmethacrylate copolymer | 4.5%-7.5% |
| Peroxyester | 1.5%-2.2% |

Pre-pregs will be prepared from the vinyl hybrid resin formulations of the Prospective Example as follows:
A carbon fibre fabric (2×2 twill weave; areal weight of 200 gsm) manufactured from a 3 k fibre (e.g., SM T300 3K from Toray®) will be impregnated with the vinyl hybrid resin formulation to obtain a prepreg with a resin content of approximately 38%. The pre-preg will be used to make an 8-ply 0/90° laminate which will then be subjected to a curing at an adequate curing temperature. The curing is expected to be performed in a steel-matched die tool pre-heated to the curing temperature.

It is expected that the vinyl hybrid formulations will exhibit a glass transition temperature (Tg) from about 130° C. to about 200° C. when cured, a phase angle of between, 70° and 85° when heated from 20° C. to 60° C. It is also expected that the vinyl hybrid formulations will exhibit a cure conversion of at least 95% when cured for a duration of no more than 10 minutes at a temperature of no more than 10° C. above the Tg of the curable resin when cured.

The invention claimed is:
1. A curable resin comprising, based on a total weight of the curable resin:
bisphenol A diglycidyl ether in an amount of 60%-70%,
tetrafunctional epoxy resin in an amount of 15%-25%,
polyvinyl formyl resin in an amount of 1%-3%,
polyethersulfone in an amount of 1%-3%,
dicyandiamide in an amount of 3%-7%,
solid disubstituted imidazole curative in an amount of 1%-4%, and
substituted urea catalyst in an amount of 1%-4%;
wherein the curable resin exhibits:
(i) a glass transition temperature (Tg) from about 130° C. to about 200° C. when cured;
(ii) a cure conversion of at least 95% when cured for a duration of no more than 10 minutes at a temperature of no more than 10° C. above the Tg of the curable resin when cured;
(iii) a phase angle of between 50° and 87°, when heated from 20° C. to 60° C.; and
(iv) a complex modulus of between about 100 Pa·s and about 10,000,000 Pa·s between 20 and 60° C.
2. The curable resin according to claim 1, wherein the curable resin exhibits a cure conversion of at least 95% when cured for a duration of no more than 10 minutes at a temperature between about 120° C. and about 175° C.

3. A pre-preg of fiber-reinforced curable composite material, wherein said pre-preg comprises at least one layer of reinforcing fibers impregnated with a curable resin according to claim 1.

4. The pre-preg according to claim 3, wherein the pre-preg comprises reinforcing fibers in an amount of from about 20% to about 70% reinforcing fibers, wherein the percentages refer to the volume percent of the fiber by total volume of the pre-preg.

5. The pre-preg according to claim 3, wherein said reinforcing fibers exhibit a tow size of at least 12,000 filaments per tow and/or said at least one layer of reinforcing fibers is a fabric which exhibits an areal weight of at least about 150 g/m².

6. The pre-preg according to claim 3, wherein said reinforcing fibers are continuous filaments.

7. The pre-preg according to claim 3, wherein the thickness of the pre-preg is from about 150 μm to about 1500 μm.

8. A process for the production of a molded article from a plurality of pre-pregs, the process comprising:
 (a) disposing a pre-preg into or onto a mold;
 (b) repeating step (a) at least once to dispose one or more further pre-pregs into or onto said mold; and
 (c) thermally curing the plurality of pre-pregs; wherein said pre-preg is a material as defined in claim 3.

9. A process according to claim 8, wherein said thermal curing is effected while the pre-pregs are compressed in a mold cavity.

10. A process according to claim 8 wherein thermal curing is conducted at a cure temperature in the range of from about 120° C. to about 175° C., and wherein the plurality of pre-pregs is held at said cure temperature for a duration of no more than 10 minutes.

11. A curable resin comprising, based on a total weight of the curable resin:
 epoxy phenol novolac in an amount of 65%-75%,
 polyvinyl formyl resin in an amount of 3%-7%,
 solid epoxy resin in an amount of 4%-8%,
 dicyandiamide in an amount of 3%-7%,
 bisphenol A diglycidyl ether in an amount of 5%-15%, and
 solid disubstituted imidazole curative in an amount of 1%-4%;
 wherein the curable resin exhibits:
 (i) a glass transition temperature (Tg) from about 130° C. to about 200° C. when cured;
 (ii) a cure conversion of at least 95% when cured for a duration of no more than 10 minutes at a temperature of no more than 10° C. above the Tg of the curable resin when cured;
 iii) a phase angle of between 50° and 87°, when heated from 20° C. to 60° C.; and
 iv) a complex modulus of between about 100 Pa·s and about 10,000,000 Pa·s between 20 and 60° C.

12. The curable resin according to claim 11, wherein the curable resin exhibits a cure conversion of at least 95% when cured for a duration of no more than 10 minutes at a temperature between about 120° C. and about 175° C.

13. A pre-preg of fiber-reinforced curable composite material, wherein said pre-preg comprises at least one layer of reinforcing fibers impregnated with a curable resin according to claim 11.

14. The pre-preg according to claim 13, wherein the pre-preg comprises reinforcing fibers in an amount of from about 20% to about 70% reinforcing fibers, wherein the percentages refer to the volume percent of the fiber by total volume of the pre-preg.

15. The pre-preg according to claim 13, wherein said reinforcing fibers exhibit a tow size of at least 12,000 filaments per tow and/or said at least one layer of reinforcing fibers is a fabric which exhibits an areal weight of at least about 150 g/m².

16. The pre-preg according to claim 13, wherein said reinforcing fibers are continuous filaments.

17. The pre-preg according to claim 13, wherein the thickness of the pre-preg is from about 150μm to about 1500μm.

18. A process for the production of a molded article from a plurality of pre-pregs, the process comprising:
 (d) disposing a pre-preg into or onto a mold;
 (e) repeating step (a) at least once to dispose one or more further pre-pregs into or onto said mold; and
 (f) thermally curing the plurality of pre-pregs; wherein said pre-preg is a material as defined in claim 13.

19. The process according to claim 18, wherein said thermal curing is effected while the pre-pregs are compressed in a mold cavity.

20. The process according to claim 18 wherein thermal curing is conducted at a cure temperature in the range of from about 120° C. to about 1 75° C., and wherein the plurality of pre-pregs is held at said cure temperature for a duration of no more than 10 minutes.

\* \* \* \* \*